United States Patent [19]

Suckow

[11] 4,438,797
[45] Mar. 27, 1984

[54] SEAL FOR A MULTIPIECE WHEEL ASSEMBLY

[75] Inventor: David S. Suckow, Decatur, Ill.

[73] Assignee: Caterpillar Tractor Co., Peoria, Ill.

[21] Appl. No.: 375,113

[22] PCT Filed: Mar. 19, 1982

[86] PCT No.: PCT/US82/00335
§ 371 Date: Mar. 19, 1982
§ 102(e) Date: Mar. 19, 1982

[87] PCT Pub. No.: WO83/03228
PCT Pub. Date: Sep. 29, 1983

[51] Int. Cl.$^3$ .............................................. B60B 25/18
[52] U.S. Cl. .............................. 152/410; 152/DIG. 10
[58] Field of Search ........................ 152/405, 409–410, 152/DIG. 10; 301/35 SL, 95–97

[56] References Cited

U.S. PATENT DOCUMENTS

| | | | |
|---|---|---|---|
| 2,822,021 | 2/1958 | Shipman et al. | 152/410 |
| 2,884,984 | 5/1959 | Riggs | 152/410 |
| 2,894,556 | 7/1959 | Darrow | 152/410 |
| 3,118,485 | 1/1964 | Le Jeune | 152/410 |
| 3,623,530 | 11/1971 | Beyers et al. | 152/410 |
| 3,882,919 | 5/1975 | Sons et al. | 152/410 |

FOREIGN PATENT DOCUMENTS 449669  7/1948  Canada ................. 152/410

Primary Examiner—Charles A. Marmor
Attorney, Agent, or Firm—J. W. Burrows

[57] ABSTRACT

A tire rim assembly (16) permits inflation of a tire (10) mounted thereon only when the components constituting the structure are assembled in a locking configuration. The tire rim assembly (16) includes a rim base (18) having first and second grooves (32,34) defined on its outer periphery (30), an annular bead seat member (24) arranged around the rim base (18) and having an inner periphery (38) defining a load transferring surface (42), an inner surface (40), and an inclined ramp surface (44) located between the inner surface (40) and the load transferring surface (42), an elastomeric seal (26) is disposed in the second groove (34), and an annular split lock ring (28) is disposed in axially restraining engagement in the first groove (32) and adapted to contact the load transferring surface (42) of the bead seat member (24) with the structure completely assembled. The elastomeric seal (26) is located by a locating surface (52) of the annular split lock ring (28) and elastically deformed by engagement of the inclined ramp surface (44) to establish an air tight seal between the elastomeric seal (26), the second groove (34), and the inclined ramp surface (44) when the lock ring (28) is properly installed. When the lock ring (28) is omitted or improperly installed the elastomric seal (26) is free of compression and will not establish an air tight seal.

6 Claims, 4 Drawing Figures

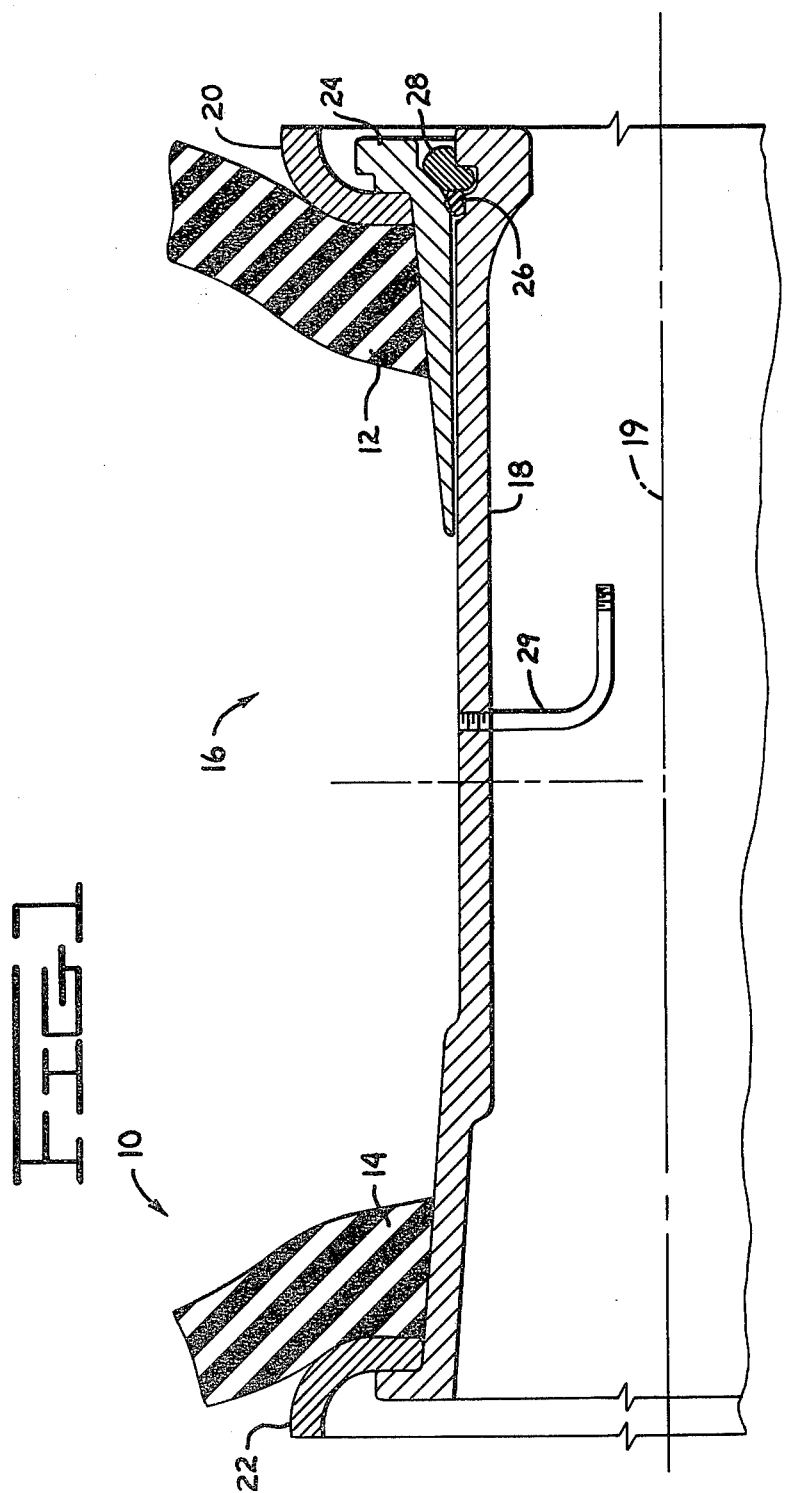

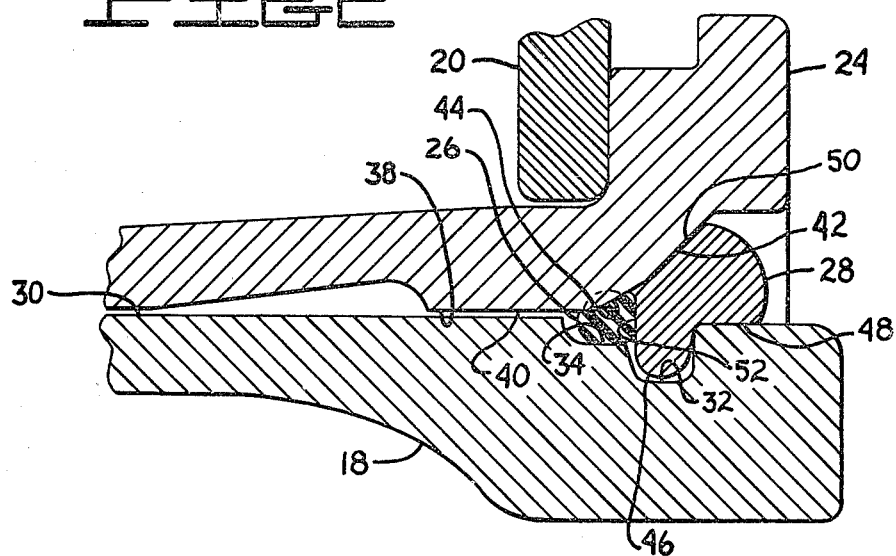
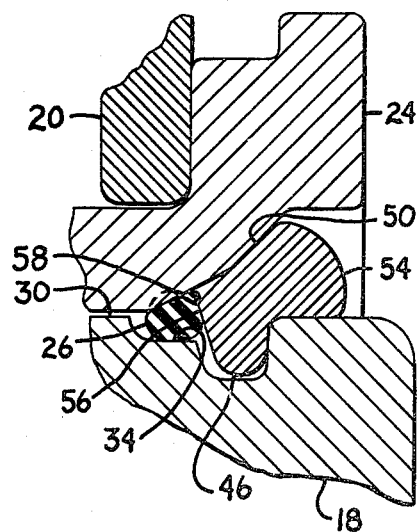
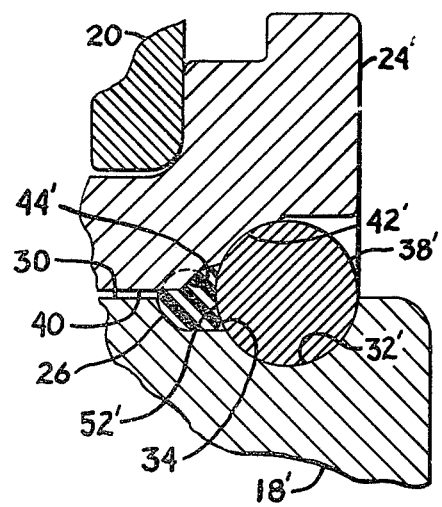

SEAL FOR A MULTIPIECE WHEEL ASSEMBLY

DESCRIPTION

1. Technical Field

This invention relates generally to a multiple-piece tire rim assembly for mounting large vehicle tires and more particularly to a sealing arrangement that provides sealing between the tire and rim components only when those components are properly installed.

2. Background Art

Large wheels used on vehicles such as earthmoving apparatus are of multi-piece construction which permit tires to be mounted thereon and locked into sealing engagement without the necessity for deforming the tire beads. The beads of a tubeless tire mounted on such multi-piece tire rim structures are axially restrained on one side by a flange which is either integral with or separate from the rim base and on the other axial side by a second flange which is either integral with or separate from a bead seat band which is mounted radially between the rim base and the remaining bead. The bead seat band is locked to the rim base by various means and a sealing structure is provided for sealing between the bead seat band and the rim base.

A typical configuration for sealing and locking a tire rim assembly is illustrated in U.S. Pat. No. 3,623,530 which issued Nov. 30, 1971, and is assigned to the assignee of the present invention. A sealing O-ring and lock ring are illustrated in the aforementioned patent and are axially separated. Such configuration has the potential to permit partial inflation of the tire if the lock ring is not properly installed or is omitted. U.S. Pat. No. 3,882,919 which issued on May 13, 1975, and is assigned to the assignee of the present invention illustrates an advance in the art by providing a seal in direct contact with the lock ring and having the groove for the seal opening into the groove for the lock ring to enable the seal to be displaced into the lock ring groove in the event that the lock ring is not installed. In the aforementioned patent, if the lock ring was inadvertently omitted, the seal could potentially roll under the bead seat band during inflation due to the axial length of the seal groove thus allowing the tire to be partially inflated. U.S. Pat. No. 2,822,021 illustrates a tire rim assembly having an axially adjacent and engaged seal apparatus and locking ring which cooperate to prevent tire inflation if the locking ring is not properly assembled. However, the apparatus of the aforementioned patent has the disadvantage of potentially allowing the tire to be partially inflated in the event the lock ring is not installed. This is possible because the seal member can be compressed between the bead seat band and the axial outer shoulder of the common seal and lock ring groove.

The present invention is directed to overcoming one or more of the problems as set forth above.

DISCLOSURE OF THE INVENTION

In one aspect of the present invention a multiple-piece tire rim assembly for mounting a tire comprises an annular rim base having an axial center line and an outer periphery defining first and second grooves. The first groove is located in an axially outer portion of the periphery of the rim base and has a depth greater than the second groove. The second groove is located axially inward of the first groove and opens into an inner side of the first groove. An annular bead seat member is disposed radially outside the rim base and has an inner periphery radially adjacent the outer periphery of the rim base. The inner periphery defines an inner surface, a load transferring surface, and an inclined ramp surface located between the inner surface and the load transferring surface. The load transferring surface extends radially outward more than the inclined ramp surface. The load transferring surface and the inclined ramp surface are respectively radially adjacent the first and second grooves. An annular split lock ring has a first portion disposed in axially restraining engagement with the first groove and a second portion in load transferring engagement with the load transfer surface of the bead seat member. An annular elastomeric seal is disposed in the second groove in axial abutment with the lock ring for sealing compression of the annular seal in the second groove by the inclined ramp surface only when the first portion of the lock ring is fully seated in the first groove and the load transferring surface of the bead seat member is in contact with the lock ring.

The problem of a tire being partially inflated with the lock ring omitted is overcome by the use of an inclined ramp surface on the bead seat member compressing an elastomeric seal only when the lock ring is fully seated in a groove of a rim base. Thus, if the lock ring is omitted, the inclined ramp surface on the bead seat member pushes the elastomeric seal into the lock ring groove which inhibits the ability of the tire to hold air pressure.

BRIEF DESCRIPTION OF THE DRAWINGS

FIG. 1 is a radial sectional view through a portion of a tire and associated rim assembly of an embodiment of the present invention;

FIG. 2 is an enlarged fragmentary view showing the right side only of the tire rim assembly of FIG. 1;

FIG. 3 is an enlarged fragmentary view of another embodiment of the invention; and FIG. 4 is an enlarged fragmentary view of another embodiment of the invention.

BEST MODE FOR CARRYING OUT THE INVENTION

Referring now to the drawing in detail, a tire 10 (only a portion of which is shown) has beads 12 and 14 which are mounted on and axially restrained by a tire rim assembly 16 which generally includes an annular rim base 18 having an axial center line 19, a pair of bead restraining flanges 20,22 respectively, a bead seat member 24 on which tire bead 12 is mounted, an elastomeric seal 26 in sealing engagement with the bead seat member 24 and the wheel rim base 18, and an annular split lock ring 28. It is recognized that the first bead restraining flange 20 could be a part of the bead seat member 24 and that the second bead restraining flange 22 could be part of the rim base 18 as is well known in the art. An air inlet 29 is mounted on the rim base 18 in a conventional manner to provide a path for air to enter the tire for inflation of the tire 10.

As best seen in FIG. 2, the annular rim base 18 has an outer periphery 30 defining first and second annular axially adjacent grooves 32,34 located in an axially outer portion of the periphery 30 of the rim base 18. The first groove 32 has a greater depth than the second groove 34 and the second groove 34 is located axially inward of said first groove 32. The second groove 34 opens into an inner side of the first groove 32 and has a width no greater than one and one half times the diameter of the elastomeric seal 26. Preferably the width of the second groove 34 is the same or slightly larger than the diameter of the elastomeric seal 26. The depth of the first groove 32 relative to the outer periphery 30 is greater than the diameter of the elastomeric seal 26 while the width of the first groove 32 is wider than the diameter of the elastomeric seal 26.

The annular bead seat member 24 is disposed radially outside the rim base 18 and has an inner periphery 38 radially adjacent the outer periphery 30 of the rim base 18. The inner periphery 38 defines an inner surface 40, a load transferring surface 42, and an inclined ramp surface 44. The inclined ramp surface 44 is located between the inner surface 40 and the load transferring surface 42. The load transferring surface 42 extends radially and axially outward more than the inclined ramp surface 44. The load transferring surface 42 and the inclined ramp surface 44 are respectively radially adjacent the first and second grooves 32,34 when the rim assembly is properly assembled. The load transferring surface 42 is located radially outward such that it would not contact any portion of the elastomeric seal 26 during assembly. The inclined ramp surface 44 is the only portion of the bead seat member 24 that initially contacts the elastomeric seal 26 during installation.

The annular split lock ring 28 has a first portion 46 adapted to locate in the first groove 32 and has a seat surface 48 adapted to contact the outer periphery 30 of the rim base 18 in the installed condition. The split lock ring 28 has a second portion 50 adapted to contact the load transferring surface 42 of the bead seat member 24 when the tire rim assembly is assembled. A locating surface 52 is provided on the axially inner side of the split lock ring 28 and faces the open side of the groove 34 in partial spanning relation to the first and second portions 46,50 of the lock ring 28.

Referring now to FIG. 3, another embodiment of the invention is disclosed. Common elements to those described in FIG. 2 will have like numbers. A lock ring 54 is similar to the lock ring 28 except the locating surface 56 of lock ring 54 has a protrusion 58 defined by the juncture of the first and second portions 46,50 of the lock ring 54.

FIG. 4 illustrates another embodiment of the present invention illustrated in FIG. 2. Elements common to those previously described have common numbers and elements that are modified will be represented by prime numbers. The outer periphery 30 of the rim base 18' defines a first toric groove 32' adapted to receive an annular split lock ring 28' having a circular cross section. The bead seat ring 24' has a load transferring surface 42' adapted to mate with the annular split ring 28'. A stepped inclined ramp surface 44' is defined on the bead seat member 24' between the load transferring surface 42' and the inner surface 40. The locating surface 52' is defined by a convex side portion of the annular split ring 28'.

Preferably the locating surface 52 of the annular split lock ring 28 is transverse to the outer periphery 30 of the rim base 18 with the annular split lock ring 28 in the installed condition. This provides a more positive locating point for the elastomeric seal 26 to ensure proper sealing of the second groove 34 and the inclined ramp surface 44 when the annular split ring 28 is in the installed condition.

Industrial Applicability

During assembly of the tire rim assembly 16, the second bead restraining flange 22 is mounted axially on the rim base 18 and the tire 10 is then axially displaced on the rim base until the bead 14 engages the second bead restraining flange 22 and the rim base 18.

The bead seat member 24 is then inserted axially between the rim base 18 and the tire bead 14 while the second bead restraining flange 20 is inserted between the tire bead 14 and the bead seat member 24 as illustrated in FIG. 1. After the aforementioned assembly, the tire bead 12, first restraining bead flange 20, and the bead seat member 24 are further displaced in an axial direction toward the bead 14 for a predetermined distance such that the annular split lock ring 28 can be placed in the first groove 32 and the elastomeric seal 26 can be installed in the second groove 34. After arranging the elastomeric seal 26 and split lock ring 28 in their respective grooves, the bead seat member 24, bead restraining flange 20, and bead 12 are allowed to move to the right as shown in the drawing. Such rightward movement is induced by the bead 12 seeking a return to its non-deformed position. Due to the smaller size of the undeformed elastomeric seal 26 relative to the load transferring surface 42 of the bead seat member 24, the load transferring surface 42 does not engage the elastomeric seal during the aforementioned rightward movement. The rightward movement of the bead seat member 24 continues until the inclined ramp surface 44 engages the elastomeric seal 26 and causes the seal to contact the locating surface 52 of the annular lock ring 28 and elastically deform thus sealing the surfaces between the elastomeric seal 26, the second groove 34, and the inclined ramp surface 44. Such elastic deformation due to the compressive force continues until the load transferring surface 42 of the bead seat member 24 contacts the second portion 50 of the annular split ring 28 whereupon further rightward movement of the aforementioned components is restrained and the annular split lock ring 28 is secured in the first groove 32.

If the seat surface 48 of annular split lock ring 28 is not in contact with the outer periphery 30 of the rim base 18, the bead seat member 24 will be moved towards the left due to the inclined surface of the load transferring surface 42 being in contact with the second portion 50 of the annular split lock ring 28. This leftward movement of the bead seat member 24 will release the deformation on the elastomeric seal 26 thus the sealing contact of the elastomeric seal 26 with the surface of the second groove 34 will no longer sustain air pressure in the tire chamber.

Furthermore, if the annular split lock ring 28 is not assembled during the initial assembly, the elastomeric seal 26 will move radially outward and drop into the first groove 32 thus not allowing any air to be maintained in the tire chamber. Since the first groove 32 has a depth and width greater than the diameter of the elastomeric seal 26, movement of the bead seat member 24 toward the rightward direction will not allow any contact at the location that the elastomeric seal 26 is in the first groove 32. It is recognized that the bead seat member 24 could contact the elastomeric seal 26 in two places around the periphery of the first groove 32 if the elastomeric seal 26 is disposed outside of the first groove 32 on the opposite side of the rim base 18. Consequently, the rightward movement of the bead seat member 24 will not allow any air to be retained in the tire cavity. The inclined ramp surface 44 of the bead seat member 24 and the proximity of the elastomeric seal 26 with the first groove 32 does not allow the elastomeric seal 26 to be trapped between the inner surface 40 of the bead seat member 24 and the second groove 34 around the rim base 18. The elastomeric seal 26 will be merely pushed into the first groove 32 upon initial contact of the inclined ramp surface 44 with the elastomeric seal 26. Once the elastomeric seal 26 drops into the first groove 32 the bead seat member 24 will not continue to move towards the rightward direction because there is not sufficient force in the tire chamber to continue the movement of the bead seat member 24.

From a review of the drawings it is readily apparent that the embodiments shown in FIGS. 3 and 4 function identically to that described in FIG. 2. In each case, if the annular lock ring 54,28' is installed properly or not installed at all the tire chamber will not hold inflation air pressure.

In view of the foregoing, it is readily apparent that the structure of the present invention provides an improved tire rim assembly that does not allow the tire to hold any inflation pressure if the annular split lock ring is not properly installed or is omitted during assembly.

Other aspects, objects and advantages of this invention can be obtained from a study of the drawings, the diclosure and the appended claims.

I claim:

1. A multiple-piece tire rim assembly (16) for mounting and sealing a tubeless tire (10), said tire rim assembly (16) comprising:

an annular rim base (18) having an axial center line (19) and an outer periphery (30) defining first and second grooves (32,34), said first groove (32) located in an axially outer portion of the outer periphery (30) of the rim base (18) and having a depth greater than said second groove (34), said second groove (34) defining a bottom surface and being located axially inward of said first groove (32), said bottom surface having a uniform diameter and opening into an inner side of said first groove (32);

an annular bead seat member (24) disposed radially outside said rim base (18) and having an inner periphery (38) radially adjacent said outer periphery (30) of said rim base (18), said inner periphery (38) defining an inner surface (40), a load transferring surface (42), and an inclined ramp surface (44) located between said inner surface (40) and said load transferring surface (42), said load transferring surface (42) extending radially outwardly and upwardly from said inclined ramp surface (44), said load transferring surface (42) and said inclined ramp surface (44) being respectively radially adjacent said first and second grooves (32,34);

an annular split lock ring (28) having a first portion (46) disposed in axially restraining engagement with said first groove (32) and a second portion (50) in load transferring engagement with said load transfer surface (42) of the bead seat member (24); and an annular elastomeric seal (26) having a cross section less than the width and depth of the first groove and being disposed in said second groove (34) in axial abutment with the lock ring (28), said annular elastomeric seal (26) being in sealing compression with said second groove (34) by said inclined ramp surface (44) only when the first portion (46) of the lock ring (28) is fully seated in the first groove (32) and said load transferring surface (42) of the bead seat member (24) is in contact with the lock ring (28) said annular elastomeric seal (26) freely moves from the second groove (34) to the first groove (32) during attempted inflation of the tubeless tire (10) in the event the lock ring (28) is omitted during assembly thus ensuring that the tire cavity does not retain any air pressure during the attempted inflation.

2. The multiple-piece tire rim assembly (16), as set forth in claim 1, wherein said first groove (32) has a toric surface (32') and said split lock ring (28) is circular in cross section (28').

3. The multiple-piece tire rim assembly, as set forth in claim 1, wherein said annular elastomeric seal (26) is free from compression when (a) said load transfer surface (42) of said bead seat member (24) is out of contact with said split lock ring (28) and (b) said first portion (46) of said split lock ring (28) is partially out of said first groove (32).

4. The multiple-piece tire rim assembly (16), as set forth in claim 3, wherein said elastomeric seal (26) is circular in cross section.

5. The multiple-piece tire rim assembly (16), as set forth in claim 1, wherein the second groove (34) has a width less than one and one half times the cross section of the elastomeric seal (26).

6. The multiple-piece tire rim assembly (16), as set forth in claim 5, wherein said width of the second groove (34) is substantially the same as said diameter of the elastomeric seal (26).

* * * * *